United States Patent Office 3,461,778
Patented Aug. 19, 1969

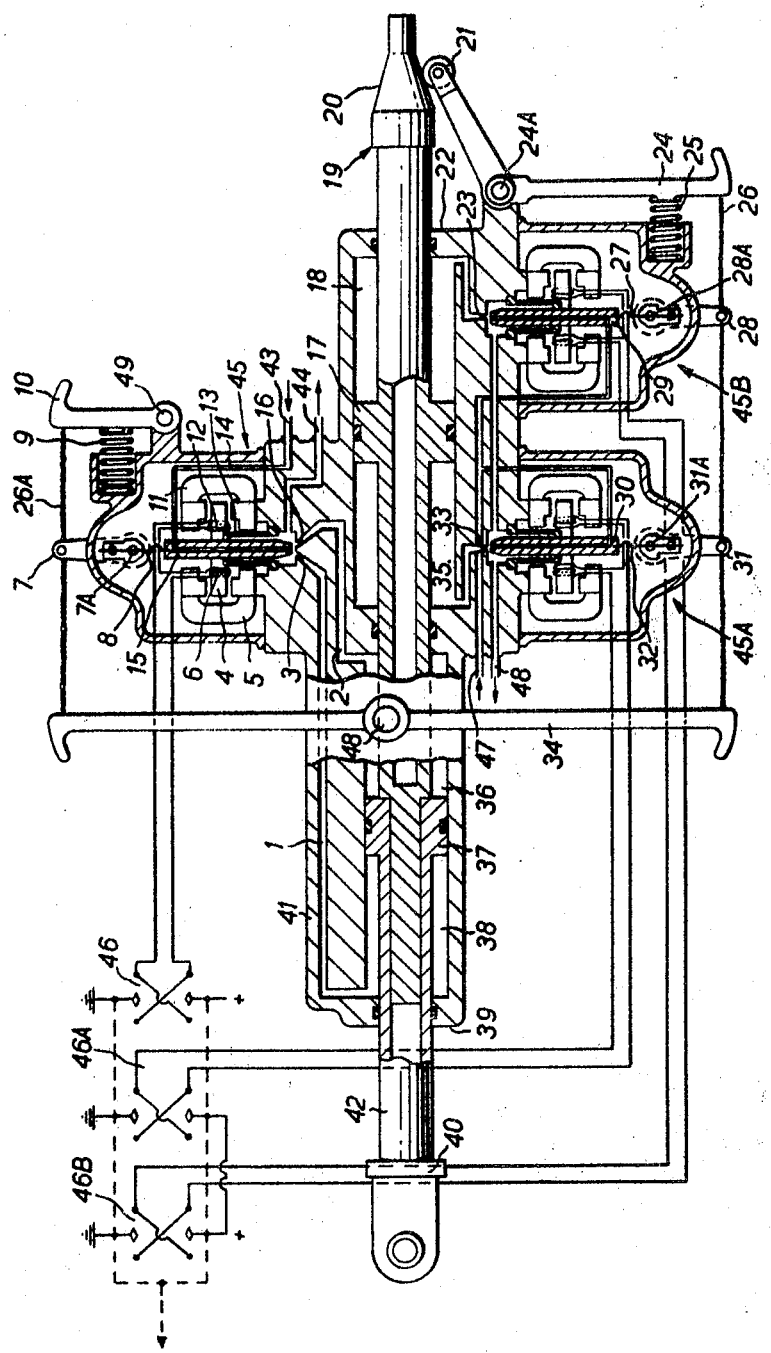

3,461,778
ELECTRO-HYDRAULIC ACTUATORS
Roy Westbury, Bridgnorth, and Peter John Maltby, Codsall, England, assignors to H. M. Hobson Limited, London, England, a company of Great Britain
Filed Sept. 22, 1967, Ser. No. 669,807
Claims priority, application Great Britain, Sept. 23, 1966, 42,673/66
Int. Cl. F15c *3/12;* F15b *9/07*
U.S. Cl. 91—3        7 Claims

ABSTRACT OF THE DISCLOSURE

An electro-hydraulic actuator having a hydraulically actuated output member movable to alternative positions under the control of electrical signals and provided with mechanical feedback for moving it to another position in the absence of electrical signals.

---

This invention is concerned with electro-hydraulic actuators, and more particularly with actuators for actuating flying control surfaces of aircraft.

The electro-hydraulic actuator according to the invention comprises a hydraulically actuated output member, means for controlling the supply of liquid under pressure to the output member to move it to various positions, an electrical device for actuating the controlling means to cause movement of the output member to alternative positions determined by electrical signals applied to the electrical device and a mechanical feedback between the output member and the controlling means for causing the latter to move the output member to another position in the absence of electrical signals.

Preferably the output member is movable to alternative end positions under control of the electrical input signals and to an intermediate position under control of the mechanical feedback. Such an actuator is of utility for transmitting signals to an aircraft flap drive unit, which will then be moved selectively to its up and down positions under control of the electrical input signals applied to the actuator and caused by the mechanical feedback to assume an intermediate position when the electrical input is switched off.

As a safeguard against hydraulic failure, the output member of the actuator may be constituted by a piston rod carrying two servo pistons supplied under control of the electrical device with pressure liquid from individual sources.

One embodiment of electro-hydraulic actuator according to the invention, for actuating a flap of an aircraft, will now be described in detail with reference to the accompanying diagrammatic drawing, which shows the actuator in vertical section.

The actuator shown in the drawing comprises a fixed cylinder block 41 in which is slidably mounted a piston rod 42 which is connected to the input of the flap drive unit (not shown). The piston rod 42 carries two pistons 17, 37; the piston 17 having twice the effective area of the piston 37. Oil flows from an inlet 43 to an outlet 44 through a flexible pipe 14 and a hollow nozzle 15 supported in a flexible bush 13 and carrying the iron armature 4 of an electromagnetic torque motor 45. The armature 4 operates in the gap between a pair of permanent magnets 5, 11 and carries coils 6 and 12 to which current is passed to operate the actuator by a pilot-operated selector switch 46. The oil emerges from the nozzle 15 as a high velocity jet which impinges on a pair of receiver ports 3 and 16 which are respectively connected, by passages 1 and 2, to chambers 38, 36 disposed on opposite sides of the piston 37.

When the coils 6 and 12 are not energized, the jet nozzle 15 is in its neutral position, i.e. disposed symmetrically with respect to the ports 3 and 16, and equal hydraulic pressures prevail in the chambers 38 and 36. When, however, a current is passed through the coils 6 and 12 the balance of flux in the gaps on either side of the armature 4 is disturbed thus causing a magnetic force couple to be exerted on the armature 4. This couple, working into the suspension stiffness afforded by the flexible bush 13, produces a deflection of the nozzle 15 in a direction determined by the direction of flow of the current. The oil emerging from the nozzle 15 as a high velocity jet accordingly impinges more directly on one of the receiver ports 3 and 16 and less directly on the other port. Such asymmetric jet impingement results in an increase of pressure in the chamber 38 or 36 connected to the port to which the jet is most directed, and a fall in pressure in the other chamber. The piston 37 is accordingly set in motion with oil flowing from the jet 15 into the higher pressure chamber and out of the lower pressure chamber through the other receiver port to the exhaust port 44.

The flow of oil from another inlet 47 is utilized to move the piston 17 under the control of two other electromagnetic torque motors 45A and 45B of the same construction as the motor 45. The supply of current to the armature coils of these motors is controlled by pilot-operated selector switches 46A and 46B respectively. The motors 45A, 45B have nozzles 30, 29 corresponding to the nozzle 15 of the motor 45 but each of the nozzles 29, 30 has only one receiver port, 23 and 33 respectively, the port 23 being connected to the chamber 18 at one side of the piston 17 and the port 33 to the chamber 35 at the other side of the piston 17. Accordingly when both the nozzles 29, 30 are in their neutral positions the pressures in the chambers 18 and 35 will be equal. Upon displacement of one of the nozzles 29, 30, however, there will be a difference in hydraulic pressure in the chambers 18, 35 tending to move the piston 17 to expel oil from the chamber at lower pressure to an outlet 48.

To select the fully retracted position of the piston rod 42 (i.e. the extreme right hand position as shown in the drawing) the armature coils of all three motors 45, 45A, 45B are energized by the switches 46, 46A, 46B with a polarity such that the nozzle 15 moves towards the port 3 to direct oil into the chamber 38, the nozzle 30 moves towards the port 33 to direct oil into the chamber 35, and the nozzle 29 moves away from the port 23 allowing the pressure in the chamber 18 to fall. This will cause the tandem pistons 17, 37 to move to the right until a shoulder 40 on the piston rod 42 strikes the end face 39 of the cylinder block 41.

For selection of the fully extended position of the jack, the polarity of the current in the armature coils of all the motors is reversed, resulting in the opposite sequence of movements of the nozzles 15, 30 and 29 and the tandem pistons 17, 37 move to the left until a shoulder 19 on the piston rod 42 meets the end face 22 of the cylinder block 41.

To select the intermediate position of the tandem piston, the armature coils of all the motors are de-energized. The tandem piston then moves to an intermediate position between its end positions determined by a mechanical feedback from the tandem piston to the nozzles which will now be described. A lever 24, loaded by a spring 25 and pivoted at 24A to the cylinder block 41, carries a follower roller 21 which is held by the spring 25 in contact with a cam constituted by a ramp 20 attached to the piston rod 42. A steel cable 26 connects the lever 24 to a lever 34, which is pivoted at 48 to the cylinder block and is connected by another steel cable 26A to a lever 10 pivoted at 49 to the cylinder block. A spring 9 applies tension to the cables 26 and 26A. The cable 26 is attached to a pair of levers 28, 31 pivoted at 28A, 31A and the cable 26A is attached to a lever 7 pivoted at 7A. The levers 7, 28 and 31 are respectively connected to the nozzles 15, 29 and 30 by cantilever leaf springs 8, 27 and 32.

The piston rod 42, which constitutes the output member of the actuator, is thus movable to alternative end positions under control of electrical input signals applied to the torque motor, and moves to an intermediate position in the absence of electrical input signals. The flap can thus be moved to up and down positions under electrical control and will assume an intermediate position under mechanical control in the event of electrical failure.

When the tandem piston has been driven electrically to one end of its stroke as described above, the feedback springs 8, 27 and 32 will all be deflected and exert forces on the nozzles which will move them to the other side of their neutral positions when electric signals are removed from the motors. This causes the pistons 17 and 37 to move towards an intermediate position. As this position is approached, the roller 21 moves along the ramp 20 gradually reducing the force in the feedback springs and restoring the nozzles to their neutral positions when the desired intermediate position is reached.

When the tandem piston 17, 37 is in the desired intermediate position, the roller 21 is midway along the ramp 20, and the levers 7, 28 and 31 are all in positions in which they impart no deflection to their leaf springs when the nozzles are in their neutral positions. If the tandem piston is disturbed from this intermediate position, the levers and leaf springs will all be deflected in a direction which will move the nozzles to cause the tandem piston to be restored to the intermediate position.

The electro-magnetic force which is developed in each nozzle when the associated armature coils are energized is much greater than the maximum force which is developed in its feedback spring when the levers 7, 28, 31 have been displaced in either direction by the maximum amount. Therefore, the presence of the mechanical feedback does not impede electrical operation of the nozzles.

Additional intermediate positions may be obtained by the provision of discrete steps on the mechanical feedback ramp 20, one for each intermediate position. Selection of these further positions demands that particular currents should be passed through the armature coils of the torque motors in order to produce electro-magnet forces corresponding to the mechanical feedback forces generated at each step on the ramp.

With this arrangement, one step on the ramp will correspond to zero electrical signal and the others to electrical signals of predetermined magnitude which balance the mechanical forces generated by the step in question. Failure of the electric supply will cause the piston rod to assume that intermediate position which corresponds to the neutral position of the nozzles.

The servo piston 37, the torque motor 45 and the feedback spring 8 would, in the absence of the other servo piston 17 and its associated torque motors and feedback springs, be effective to move the piston rod 42 to alternative end positions under control of electrical input signals and to move it to an intermediate position in the absence of electrical input signals. The second servo piston 17 and associated torque motors and feedback springs are provided as a safeguard against hydraulic failure. Owing to the duplication of the pistons 17, 37, one will be available to move the piston rod to its alternative positions, provided oil pressure is still available to it, notwithstanding failure of hydraulic pressure to the other piston.

What we claim as our invention and desire to secure by Letters Patent is:

1. An electro-hydraulic actuator comprising a hydraulically actutaed output member carrying a servo piston, an electromagnetic torque motor having an armature, a nozzle attached to the armature and movable from a neutral position in response to electrical input signals applied to said torque motor to establish a differential hydraulic pressure at opposite sides of the servo piston and thereby cause movement of the output member to alternative positions determined by said electrical input signals and a mechanical feedback connection including a spring between the output member and the nozzle for causing the latter to move the output member to another position in the absence of electrical signals.

2. An actuator as claimed in claim 1, which includes a cam on the piston rod, a pivoted lever carrying a follower, a spring urging the lever to maintain the follower in contact with the cam and another pivoted lever mechanically connected to the lever carrying the follower, the feedback spring being a leaf spring connecting the nozzle and the other pivoted lever.

3. An actuator as claimed in claim 1, in which the output member is movable to alternative end positions under control of the electrical input signals and to an intermediate position under control of said mechanical feed back connection.

4. An electro-hydraulic actuator comprising an output member carrying two servo pistons supplied with pressure liquid from different sources, three electromagnetic torque motors each having an armature, one of said torque motors being associated with one servo piston and the other two torque motors being associated with the other servo piston, nozzles attached to the armatures of the torgue motors, the nozzle of the motor associated with said one servo piston being movable from a neutral position to effect differential distribution of pressure liquid between two receiver ports connected to opposite ends of said servo piston and the nozzles of the other motors each having a single receiver port, one of which is connected to one end and the other to the other end of the other servo piston, said nozzles being effective in response to electrical input signals applied to the torque motors to move the output member to alternative end positions determined by said electrical input signals, and springs connected between the nozzles and the output member and constituting a mechanical feed back connection for moving the output member to an intermediate position in the absence of electrical signals.

5. An actuator as claimed in claim 4, which includes a cam on the piston rod, a pivoted lever carrying a follower, a spring urging the lever to maintain the follower in contact with the cam, and other pivoted levers associated one with each of the nozzles and mechanically connected to the lever carrying the follower, the feed back springs being connected between the nozzles and their respective other pivoted levers.

6. An electro-hydraulic actuator comprising a hydraulically operated output member, controlling means which is movable to alternative positions from a neutral position and which controls the supply of liquid under pressure to the output member to cause the output member to assume positions corresponding to those of the controlling means, a mechanical feedback connection between the output member and the controlling means which, upon movement of the output member in response to displacement of the controlling means from its neutral position, applies to the controlling means a force tending to restore it to its neutral position, and an electrical device which is operative to shift the controlling means to its alternative displaced positions under the control of electrical signals applied to the electrical device and to retain the controlling means in each of its displaced positions against the force exerted on it by the mechanical feedback connection.

7. An electro-hydraulic actuator comprising an output member carrying a servo piston, controlling means which is movable to alternative displaced positions from a neutral position to establish a differential hydraulic pressure on opposite sides of the servo piston and thereby cause movement of the output member to alternative end positions determined by the displaced positions of the controlling means, a mechanical feedback connection between the output member and the controlling means which, upon movement of the output member in response to displacement of the controlling means from its neutral position, applies to the controlling means a force tending to restore it to its neutral position, and an electrical device which is operative to shift the controlling means to its alternative displaced positions under the control of electrical signals applied to the electrical device and to retain the controlling means in each of its displaced positions against the force exerted on it by the mechanical feedback connection.

References Cited

UNITED STATES PATENTS

| 2,886,009 | 5/1959 | Myers | 91—360 |
| 3,190,185 | 6/1965 | Rasmussen. | |

PAUL E. MASLOUSKY, Primary Examiner

U.S. Cl. X.R.

91—360, 411, 459.